United States Patent [19]

Yamada et al.

[11] Patent Number: 4,975,557
[45] Date of Patent: Dec. 4, 1990

[54] WIRE CUTTING ELECTRIC DISCHARGE MACHINE WITH NOZZLE COLLISION DETECTION

[75] Inventors: Hisashi Yamada; Toshio Suzuki; Takeshi Iwasaki, all of Aichi, Japan

[73] Assignee: Mitsubishi Denki Kabushiki Kaisha, Tokyo, Japan

[21] Appl. No.: 445,294

[22] Filed: Dec. 4, 1989

[30] Foreign Application Priority Data

Dec. 26, 1988 [JP] Japan .................. 63-328674

[51] Int. Cl.⁵ .................. B23H 7/10; B23Q 5/58
[52] U.S. Cl. .................. 219/69.12; 324/691
[58] Field of Search ............. 324/691, 693, 705, 706, 324/724; 73/104, 105; 219/69.12, 69.14

[56] References Cited

U.S. PATENT DOCUMENTS

| | | | |
|---|---|---|---|
| 2,472,214 | 6/1949 | Hurvitz | 324/691 |
| 3,358,228 | 12/1967 | Bucher | 324/706 |
| 3,818,334 | 6/1974 | Rosenberg | 324/691 |
| 4,814,574 | 3/1989 | Babel et al. | 219/69.14 |

FOREIGN PATENT DOCUMENTS 60-108192  6/1985  Japan .

Primary Examiner—A. D. Pellinen
Assistant Examiner—Geoffrey S. Evans
Attorney, Agent, or Firm—Sughrue, Mion, Zinn, Macpeak & Seas

[57] ABSTRACT

In a machining device such as a wire cut electric discharge machine, an electrically conductive rubber member is attached to the machining solution jetting nozzle of its machining head in such a manner that, when the machining head abuts against the workpiece, the resistance of the rubber member is changed being compressed by the nozzle and the workpiece, and the change in resistance of the rubber member is detected to determine whether the change in resistance is normal or abnormal, thereby to detect the collision of the nozzle with the workpiece, whereby the machining head is protected from damage.

3 Claims, 5 Drawing Sheets

WIRE CUTTING ELECTRIC DISCHARGE MACHINE WITH NOZZLE COLLISION DETECTION

BACKGROUND OF THE INVENTION

This invention relates to a machining device such as a wire cut electric discharge machine which has a machining solution jetting nozzle.

FIG. 5 shows the positional relationship between an X-Y cross table and a machining head in a wire cut electric discharge machine. In FIG. 5, reference numerals 1 designates a workpiece to be machined which is placed on the X-Y cross table 2 which is movable in a horizontal plane; and 3, the machining head which has a machining solution jetting nozzle 4 and an electrode guide 6 and is fixedly secured to a shaft 7 which is movable in a Z-axis direction in the electric discharge machine body (not shown). The X-Y table 2 and the shaft 7 are moved by drive motors 15 and 16, and a drive motor 17, respectively, and the amounts of movement of them are controlled by a control unit 9. By moving the X-Y cross table 2, the workpiece 1 and the wire electrode 5 are two-dimensionally moved relative to each other. The workpiece 1 and the nozzle 4 are positioned in place by moving the machining head 3. In the case where the workpiece 1 is not uniform in thickness, the machining head 3 is automatically moved in the Z-axis direction according to the thickness.

In order to increase a machining speed in a wire cut electric discharge machining operation, it is necessary to efficiently and sufficiently remove sludge from the machining groove. For this purpose, it is essential to minimize the amount of machining solution leaking through the gap between the workpiece 1 and the mouth of the machining solution jetting nozzle 4, thereby to increase the pressure of the machining solution in the machining groove. In general, the distance between the mount of the machining solution jetting nozzle 4 and the workpiece 1 is about 100 μm; that is, it is rather difficult to visually confirm. The machining head 3 must be in the Z-axis direction according to the thickness of a workpiece 1 while the distance being maintained therebetween until it is accurately positioned in place. For this purpose, the following two methods of positioning the machining head may be considered: In the first method, the machining head is positioned with a thickness gage or the like interposed between the workpiece 1 and the end face of the nozzle 4. In the second method, after the end face of the nozzle 4 is brought into contact with the workpiece 1, the machining head 3 is lifted by a required distance. Therefore, in order to prevent the difficulty that, while the machining head 3 is being moved with the drive motor so as to be positioned, the machining solution jetting nozzle 4 is broken colliding with the workpiece in error, it is necessary to provide means for detecting the collision to stop the machining head.

FIGS. 6A and 6B are a sectional view showing a conventional machining head. The machining solution jetting nozzle 4 is secured to the lower end portion of the machining head through a spring 10 with a retainer 11. The machining head has a limit switch 12 to detect the lift of the machining solution jetting nozzle 4. The output of the limit switch 12 is applied to the control unit 9.

In the FIG. 6A, the nozzle 4 is not in contact with the workpiece 1. Under this condition, the nozzle 4 is so held by the spring 10 and the retainer 4 that the limit switch 12 is not operated. As the machining head 3 is moved towards the workpiece 1, the nozzle 4 is brought into contact with the workpiece 1, and stopped thereby. When, under this condition, the machining head 3 is further moved towards the workpiece 1, the limit switch 12 secured to the maching head 3 is struck against the upper end face of the machining solution jetting nozzle 4 so that it is operated to output a signal. The signal is applied to the control unit 9 to stop the movement of the machining head 3.

As was described above, in the conventional wire cut electric discharge machine, when the machining head is moved downwardly, in the Z-axis direction, its collision with the workpiece is detected as follows: After the machining solution jetting nozzle of the machining head has been brought into contact with the workpiece, the limit switch is mechanically operated to output the signal to stop the movement of the machining head. However, the method is disadvantageous in that the limit switch may be not correctly operated because of the sludge accumulated during machining so that the machining head is not stopped, with the result that the machining solution jetting nozzle, the shaft, and the machining head are broken. Furthermore, in the above-described conventional wire cut electric discharge machine, it cannot be detected when the workpiece is moved horizontally to collide with the nozzle.

SUMMARY OF THE INVENTION

Accordingly, an object of this invention is to eliminate the above-described difficulties accompanying a conventional machining device such as a wire cut electric discharge machine.

More specifically, an object of the invention is to provide a machining device in which the collision of a maching member such as a machining head with the workpiece can be positively detected.

The foregoing object and other objects of the invention has been achieved by the provision of a machining device comprising: a nozzle for jetting a solution for acceleration of a machining operation, the nozzle being made of an electrically insulating material; and a machining tool for machining a workpiece, the machining tool being arranged at the solution jetting mouth of the nozzle, which, according to the invention, further comprises: an electrically conductive elastic member which is secured to at least a part of the nozzle, the elastic member being changed in resistance when deformed; means for detecting the change in resistance of the elastic member; and means for determining whether the change in resistance is caused by the pressure of the solution jetted from the nozzle or by the collision of the nozzle, to stop a machining operation when the change in resistance is caused by the collision of the nozzle.

In the machining device according to the invention, when the machining solution jetting nozzle collides with the workpiece, the nozzle and the workpiece compresses the electrically conductive elastic member thereby to change its resistance, and the change in resistance thus caused is detected. The change in resistance caused by the collision is different in characteristic from that in resistance caused by the pressure of the solution jetted from the nozzle. By discriminating the two difference changes in resistance, the collision of the nozzle with the workpiece can be detected.

The nature, principle and utility of the invention will become more apparent from the following detailed description in conjunction with the accompanying drawings, in which like parts are designed by like reference numerals or characters.

BRIEF DESCRIPTION OF THE DRAWINGS

In the accompanying drawings.

The FIG. 1A is a sectional view, partly as a block diagram, showing a machining head in a first example of a machining device according to this invention, and the FIG. 1B is also a sectional view showing the machining head with its machining solution jetting nozzle abutted against the workpiece through an electrically conductive rubber member.

Figure 4A:
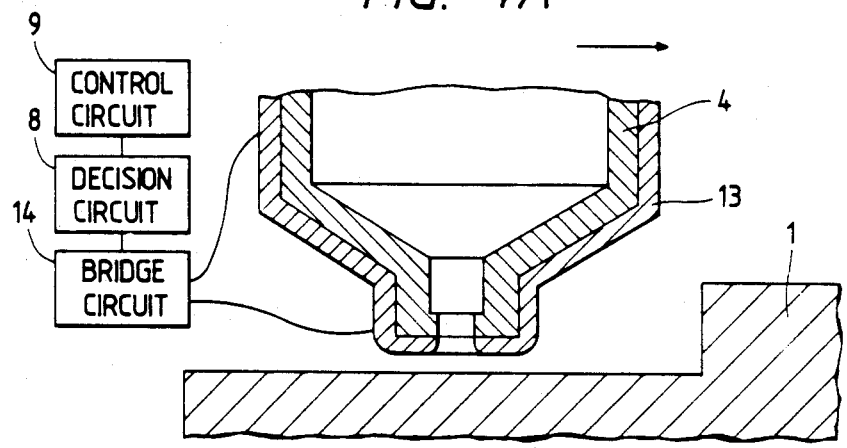
Figure 4B:
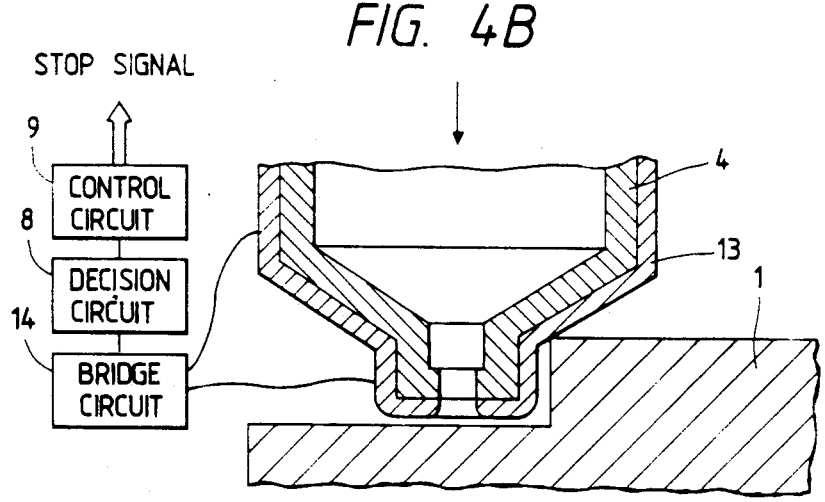
Figure 5:
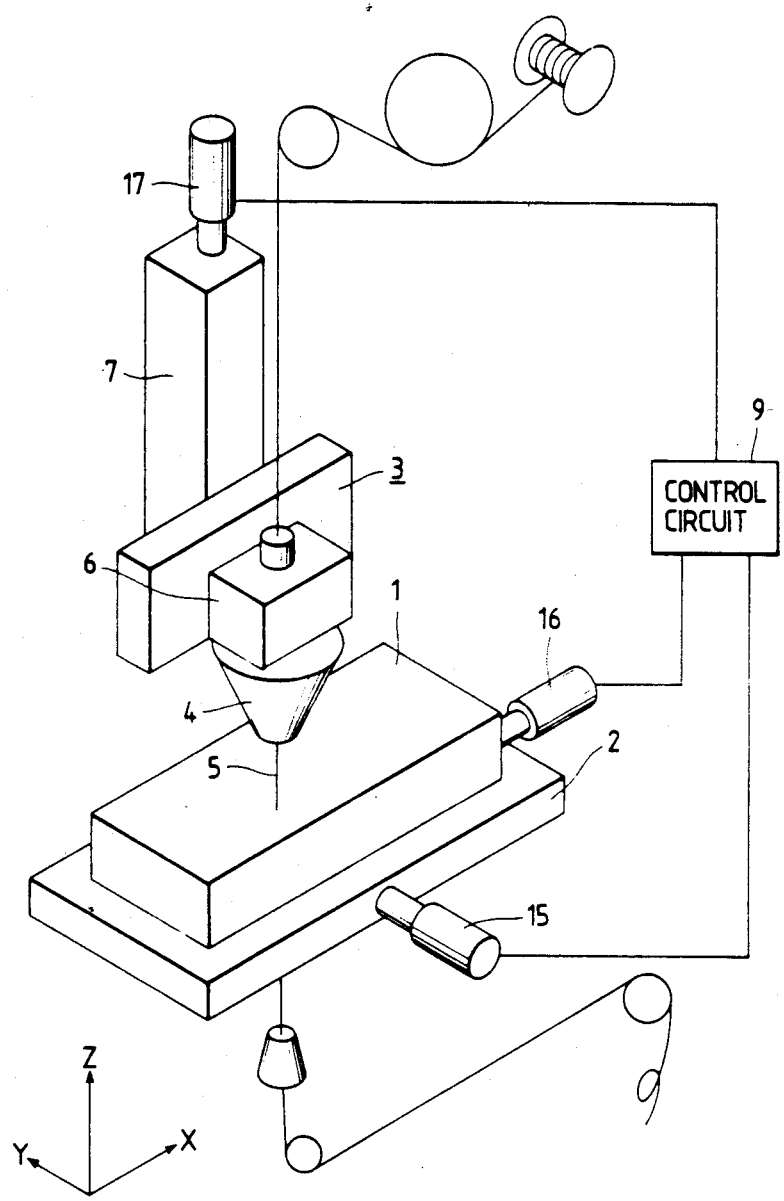
Figure 6A:
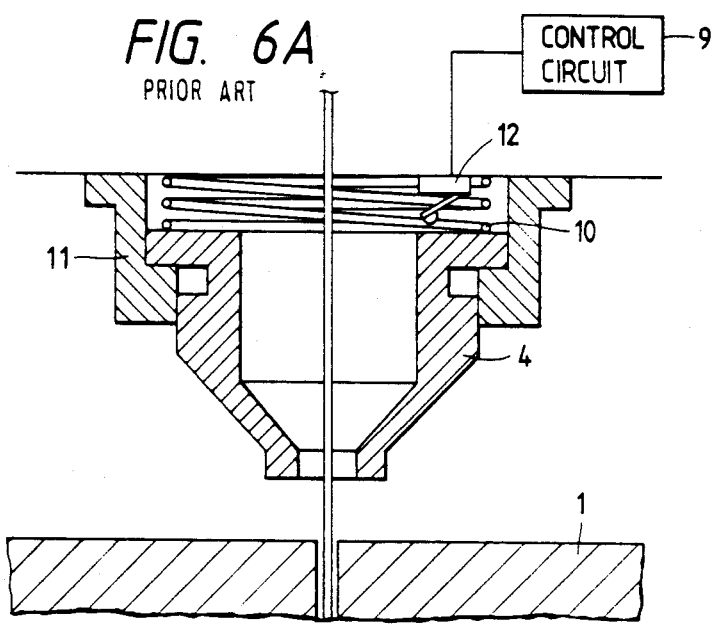
Figure 6B:
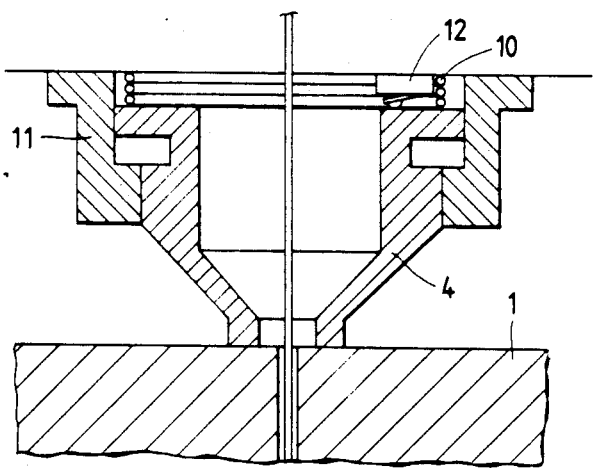

The FIG. 4A and 4B are sectional views, partly as block diagrams, showing a second example of the machining device according to the invention;

FIG. 5 is a perspective view showing the positional relationships between an X-Y cross table and a machining head in a wire cut electric discharge machine; and The FIG. 6A and 6B are sectional views showing a conventional machining head in a wire cut electric discharge machine.

DETAILED DESCRIPTION OF THE INVENTION

One example of a machining device according to this invention will be described with reference to FIG. 1.

Figure 1A:
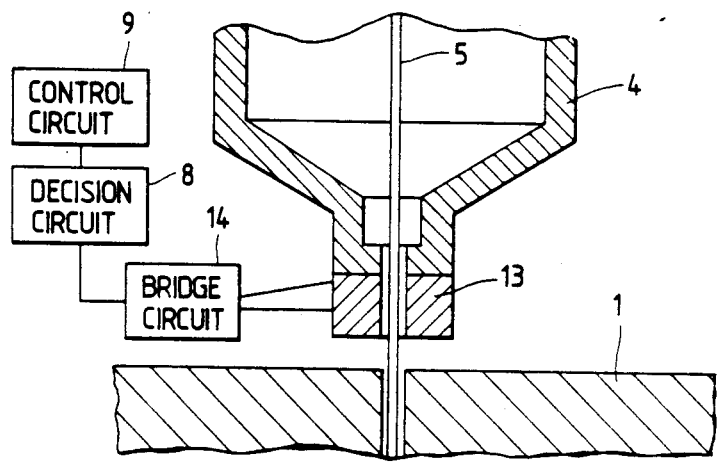
Figure 1B:
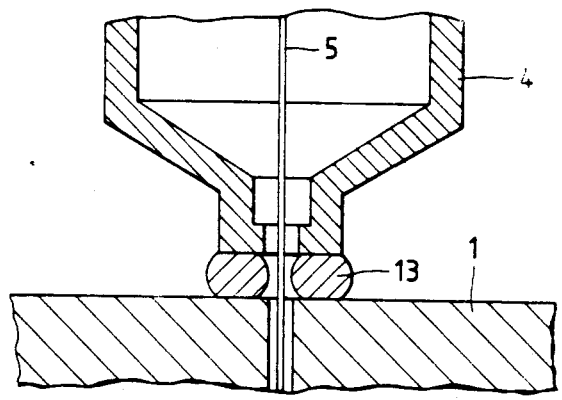
Figure 2:
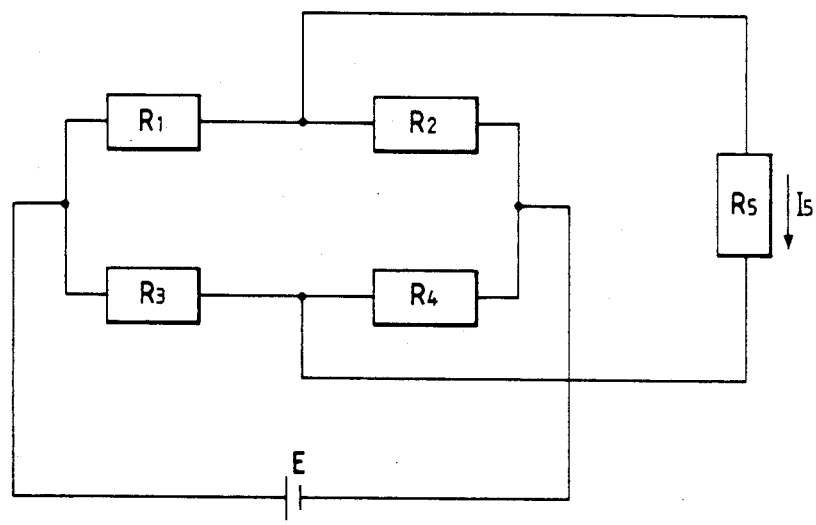
FIG. 2 is a circuit diagram showing a bridge circuit in the FIG. 1A.

In the machining device, as shown in FIG. 1, a machining solution jetting nozzle 3 made of insulating material is secured to the lower end portion of a machining head, and an electrical conductive rubber member 13 is connected to the lower end face of the nozzle 3 which confronts with a workpiece 1. A bridge circuit 14 is connected to the rubber member 13, to measure the change in resistance of the latter 13 when deformed. The bridge circuit, as shown in FIG. 2, is a conventional one. In the bridge circuit 14 comprises resistors $R_1$, $R_2$, $R_3$ and $R_5$ whose resistances are known, and a resistor $R_4$ whose resistance is unknown. The resistor $R_4$ is the above-described electrically conductive rubber member 13.

In the FIG. 1A, the machining solution jetting nozzle 4 is not in contact with the workpiece 1. Under this condition, the resistances of the resistors $R_1$, $R_2$ and $R_3$ are adjusted to meet $R_2.R_3 = R_1.R_4$ so that a current $I_5$ may not flow in the resistor $R_5$. When, under this condition, the machining head 3 is moved by the drive motor downwardly along the Z-axis, the electrically conductive rubber membrane 13 secured to the lower end face of the nozzle 4 is brought into contact with the workpiece 1. In this operation, since the machining solution jetting nozzle is made of insulating material, the workpiece is prevented from electric erosion. As the machining head 3 is further moved downwardly, the electrically conductive rubber member 13 is compressed; i.e., strained, by the workpiece and the machining solution jetting nozzle 4 which is, for instance, made of hard material such as ceramic. When the rubber member 13 is strained within the elastic limit, it will raise the machining head 3, and when released, its configuration will be restored. If the resistance of the resistor $R_4$ is increased as much as $\Delta R_4$ by the strain, current $I_5$ proportional to $R_4/\Delta R_4$ will flow in the bridge circuit 14. The current $I_5$ is detected by a decision circuit 8, and it is applied, as a stop signal, to the control unit 9, so as to stop the shaft 7. As a result, the downward movement of the machining head can be stopped at the instant the machining solution jetting nozzle 4 is brought into contact with the workpiece 1. The electrically conductive rubber member additionally serves to protect the nozzle 4 from damage.

Figure 3:
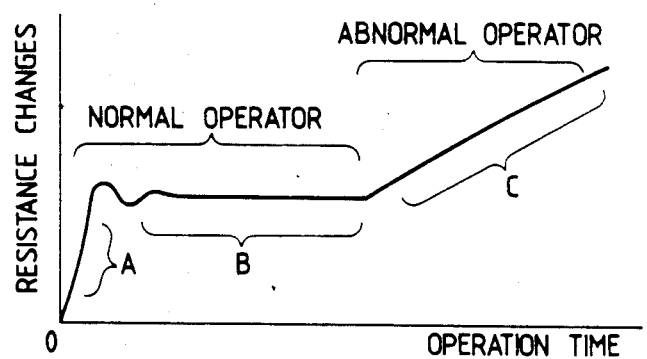
FIG. 3 is a graphical representation showing the change in resistance of the electrically conductive rubber member in the device according to the invention.

The wire cut electric discharge machine, after started, operates as follows: When, before a machining operation, the positioning operation has been accomplished in the above-described manner, the machining solution is jetted from the nozzle 4, and a machining signal is applied to the wire electrode 5. Thus, the machining operation is started. FIG. 3 shows the change in resistance of the electrically conductive rubber member 3 after the start of the machining operation. In FIG. 3, reference character A designates the change in resistance which attributes to the pressure of the machining solution initially jetted; that is, the resistance changes abruptly. Being elastic, the rubber member oscillates for a short period of time. After this transient phenomenon, the resistance is maintained constant as indicated at B until the speed of jet of the machining solution is changed. And if, in the case where the machining head is being moved, the resistance changes on from a certain time instant as indicated at C, then it can be determined that the machining solution jetting nozzle 4 is brought into contact with an object, thus deforming the electrically conductive rubber member 13. The decision circuit 8 determines it from the above-described resistance characteristics whether the change in resistance is caused by the normal operation or by the collision of the nozzle. When it is determined that the change in resistance causede by the collision, the decision circuit supplies a signal to the control circuit 9 to inform of it.

In the above-described embodiment, the rubber member 13 is connected to the lower end face of the machining solution jetting nozzle 4 which confronts with the workpiece; however, the nozzle 4 may be covered, in its entirety, with an electrically conductive rubber member (13) as shown in FIG. 4. This modification is effective in detecting the collision of the nozzle when the machining head is moved in a horizontal plane, or in a two dimensional plane X-Y.

While the invention has been described with reference to the wire cut electric discharge machine, the technical concept of the invention can be equally applied to any machining device with a machining tool and a fluid jetting nozzle with the same effect.

As was described above, in the machining device, according to the invention, the collision of the machining solution jetting nozzle with the workpiece is detected by using in combination the electrically conductive elastic member, the means for detecting the change in resistance of the elastic member, and the means for determining whether the change in resistance of the elastic member is normal or abnormal. Therefore, in the machining device according to the invention, the collision of the machining solution jetting nozzle with the workpiece can be positively detected, whereby the machining head can be protected.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A machining device comprising: a nozzle for jetting a solution for acceleration of a machining operation, said nozzle being made of an electrically insulating material; and a machining tool for machining a workpiece, said machining tool being arranged at the solution jetting mouth of said nozzle, which further comprises:

an electrically conductive elastic member which is secured to at least a part of said nozzle, said elastic member being changed in resistance when deformed;

means for detecting the change in resistance of said elastic member; and means for determining whether said change in resistance is caused by the pressure of said solution jetted from said nozzle or by the collision of said nozzle, to stop a machining operation when said change in resistance is caused by the collision of said nozzle.

2. A machining device according to claim 1, in which said elastic member is connected to the lower end face of said machining solution jetting nozzle which confronts with the workpiece.

3. A machining device according to claim 1, in which said nozzle is covered, it its entirety, with said electrically conductive rubber member.

* * * * *